United States Patent
Laubry et al.

(10) Patent No.: US 7,056,998 B2
(45) Date of Patent: Jun. 6, 2006

(54) CATALYTIC SYSTEM FOR THE PREPARATION OF POLYBUTADIENES AND PREPARATION PROCESS

(75) Inventors: Philippe Laubry, Greer, SC (US); Fanny Barbotin, Clermont-Ferrand (FR)

(73) Assignee: Michelin Recherche et Technique S.A., Granges-Pacco (CH)

( * ) Notice: Subject to any disclaimer, the term of this patent is extended or adjusted under 35 U.S.C. 154(b) by 0 days.

(21) Appl. No.: 10/989,031

(22) Filed: Nov. 16, 2004

(65) Prior Publication Data

US 2005/0130835 A1    Jun. 16, 2005

Related U.S. Application Data

(63) Continuation of application No. PCT/EP03/04314, filed on Apr. 25, 2003.

(30) Foreign Application Priority Data

May 16, 2002   (FR) ................... 02 06244

(51) Int. Cl.
*C08F 36/04*     (2006.01)
*C08F 4/52*      (2006.01)

(52) U.S. Cl. .................. 526/164; 526/153; 526/161; 502/104; 502/117; 502/132

(58) Field of Classification Search ............ 502/104, 502/117, 132; 526/153, 161, 164
See application file for complete search history.

(56) References Cited

U.S. PATENT DOCUMENTS 6,437,205 B1 *  8/2002  Miller et al. .................. 585/12

FOREIGN PATENT DOCUMENTS

| EP | 0 304 088 A1 | 2/1989 |
| EP | 0 846 707 A1 | 1/1998 |
| WO | 02/38636 A1 | 5/2002 |

OTHER PUBLICATIONS

Monakov et al., "Investigation of the Polymerization of Isoprene in the Presence of Catalyst System Containing Lathanide Salts", Doklady Physical Chemistry, Consultants Bureau, New York, nY, USA, vol. 234, No. 5, pp. 587-589 (1977).

* cited by examiner

*Primary Examiner*—Fred Teskin
(74) *Attorney, Agent, or Firm*—Buchanan Ingersoll PC

(57) ABSTRACT

The present invention relates to a catalytic system usable for the preparation of polybutadienes by polymerisation, to a process for the preparation of said catalytic system and to a process for the preparation of polybutadienes by means of this catalytic system.

A catalytic system according to the invention is based on at least:
- a conjugated diene monomer,
- an organic phosphoric acid salt of one or more rare earth metals, said salt being in suspension in at least one inert, saturated and aliphatic or alicyclic hydrocarbon solvent,
- an alkylating agent consisting of an alkylaluminium of formula $AlR_3$ or $HAlR_2$, the "alkylating agent:rare earth salt" molar ratio being greater than 5, and
- a halogen donor which belongs to the family of alkylaluminium halides with the exception of alkylaluminium sesquihalides,
- and, according to the invention, said catalytic system comprises said rare earth metal(s) in a concentration equal to or greater than 0.005 mol/l.

14 Claims, No Drawings

… … …

CATALYTIC SYSTEM FOR THE PREPARATION OF POLYBUTADIENES AND PREPARATION PROCESS

CROSS-REFERENCE TO RELATED APPLICATIONS

This application is a continuation of PCT Application No. PCT/EP03/04314, filed Apr. 25, 2003, now WO 03/097708 (published in French) that designates the United States of America and which claims priority from French Application No. 0206244, filed May 16, 2002. The disclosure of both applications is incorporated herein in their entireties.

FIELD OF THE INVENTION

The present invention relates to a catalytic system usable for the preparation of polybutadienes by polymerisation, to a process for the preparation of said catalytic system and to a process for the preparation of polybutadienes by means of this catalytic system.

BACKGROUND OF THE INVENTION

For the polymerisation of butadiene, it is known from US patent specification U.S. Pat. No. 3,794,604 (see examples of embodiment) to use a catalytic system of "preformed" type in the presence of a conjugated diene monomer, comprising:

butadiene or isoprene as the conjugated diene monomer, cerium octanoate as the rare earth salt in solution in benzene, diisobutylaluminium hydride as the alkylating agent, in an "alkylating agent:rare earth salt" molar ratio substantially equal to 20, and ethylaluminium dichloride as the alkylaluminium halide.

Japanese patent specification JP-A-60/23406 also describes a catalytic system of the type which has been "preformed" in the presence of butadiene, the system specifically being intended for the polymerisation of butadiene. The catalytic systems of this document comprise:

butadiene as the conjugated diene monomer, a rare earth salt of a trivalent or pentavalent organic phosphoric acid in solution in n-hexane or cyclohexane, an alkylating agent consisting of an alkylaluminium of formula $Al(R^5)_{3-n}H_n$, where n has the value 0, 1 or 2 and $R^5$ is a hydrocarbon comprising 1 to 8 carbon atoms, and a halogenated Lewis acid belonging equally well to the family of monohalides, sesquihalides and oligohalides [of] elements of groups IIIa, Iva or Va of Mendeleev's periodic table or alternatively organometallic alkylaluminium halides.

In virtually all the examples of embodiment of this document, the halogenated Lewis acid which is effectively used is an alkylaluminium sesquichloride and, in these examples, the corresponding catalytic systems comprise said rare earth in a concentration varying substantially from 0.0002 mol/l to 0.016 mol/l (see Example 23, in which the estimated concentration of rare earth is between 0.015 and 0.016 mol/l).

In other examples of embodiment (Examples 10 and 19), the halogenated Lewis acid is diethylaluminium chloride or ethylaluminium bromide and the corresponding catalytic systems then comprise said rare earth in the extremely reduced concentration of 0.0002 mol/l.

As for the "alkylating agent:rare earth salt" molar ratios which are effectively used in these examples of embodiment, they vary from 10 to 30.

One major disadvantage of all the catalytic systems tested in this patent specification JP-A-60/23406 lies in the fact that none of the polybutadienes obtained by means of these catalytic systems has both a polydispersity index of less than 2.1 and a Mooney viscosity ML(1+4) at 100° C. at least equal to 40. As a result, these polybutadienes are not suitable for use in a tyre tread.

Another drawback of the catalytic systems of this document JP-A-60/23406 lies in the non-reproducibility of the microstructure characteristics of the polybutadienes obtained, in particular for the cis-1,4 linkage contents, which may vary significantly from 89% to 99% in the examples of embodiment.

The applicant has unexpectedly discovered that a catalytic system of the "preformed" type based on at least:

a conjugated diene monomer, an organic phosphoric acid salt of one or more rare earth metals (metals with an atomic number between 57 and 71 in Mendeleev's periodic table), said salt being in suspension in at least one inert, saturated and aliphatic or alicyclic hydrocarbon solvent, and this catalytic system comprising the rare earth metal or metals in a concentration equal to or greater than 0.005 mol/l, an alkylating agent consisting of an alkylaluminium of formula $AlR_3$ or $HAlR_2$, the "alkylating agent:rare earth salt" molar ratio being greater than 5, and a halogen donor which belongs to the family of alkylaluminium halides with the exception of alkylaluminium sesquihalides, makes it possible to overcome the aforementioned drawbacks by leading in particular to obtaining polybutadienes having, on one hand, a polydispersity index, measured by the "SEC" technique of size exclusion chromatography (see attached Appendix 2), which is less than 2.1 and, on the other hand, a Mooney viscosity ML(1+4) at 100° C., measured in accordance with Standard ASTM D 1646, which may be equal to or greater than 40. These combined characteristics make the polybutadienes obtained by means of catalytic systems according to the invention particularly well-suited for use in tyre treads.

DETAILED DESCRIPTION OF THE PREFERRED EMBODIMENTS

It will be noted that the alkylaluminium sesquihalides, such as ethylaluminium sesquichlorides, cannot be used in the catalytic systems according to the invention, owing to the fact that in no case do they make it possible to obtain polybutadienes having a polydispersity index of less than 2.1, whatever the value of concentration of rare earth(s) used in these catalytic systems (i.e. even for values of said concentration which might be greater than 0.005 mol/l, for example close to 0.016 mol/l after the fashion of said Example 23 of the aforementioned document JP-A-60/23406).

It will also be noted that this exclusion of the alkylaluminium sesquihalides for the halogen donor is a necessary condition, but one which is not sufficient to obtain polybutadienes having a polydispersity index and a Mooney viscosity as mentioned above. To this end, it is furthermore necessary for the concentration of rare earth(s) in the catalytic system to be at least equal to 0.005 mol/l (i.e. a concentration at least 25 times greater than said concentration of 0.0002 mol/l which is used in said document JP-A-60/23406).

It will furthermore be noted that the catalytic systems according to the invention also make it possible to obtain polybutadienes having both a polydispersity index of less than 2.1 and a Mooney viscosity ML(1+4) at 100° C. of less than 40, for example strictly between 25 and 40.

Preferably, said catalytic system according to the invention comprises said rare earth metal(s) in a concentration within a range from 0.010 mol/l to 0.060 mol/l.

It will be noted that the catalytic systems according to the invention make it possible to obtain polybutadienes having inherent viscosities, measured at 25° C. and in a concentration of 0.1 g/dl in toluene (see Appendix 3 for the measurement method) which are greater than 2 dl/g.

It will also be noted that these catalytic systems make it possible to obtain polybutadienes having a high, reproducible content of cis-1,4 linkages greater than 96.5% (measured by the technique of near-infrared analysis (NIR), see attached Appendix 1).

Of course, the phrase "based on" used to define the constituents of the catalytic system is taken to mean the mixture and/or the reaction product of these constituents.

1,3-butadiene may be mentioned as a preferred conjugated diene monomer usable for "preforming" the catalytic system of the invention.

Mention may also be made of are 2-methyl-1,3-butadiene (or isoprene), 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene or any other conjugated diene having between 4 and 8 carbon atoms.

It will be noted that the "monomer:rare earth salt" molar ratio may have a value ranging from 15 to 70.

According to another characteristic of the invention, said rare earth salt is formed of a non-hygroscopic powder having a slight tendency to agglomerate at ambient temperature.

According to a preferred embodiment of the invention, said inert hydrocarbon solvent in which said rare earth salt is in suspension is an aliphatic or alicyclic solvent of low molecular weight, such as cyclohexane, methylcyclohexane, n-heptane, or a mixture of these solvents.

Even more preferably, methylcyclohexane is used as inert hydrocarbon solvent.

According to another embodiment of the invention, said solvent used to suspend the rare earth salt is a mixture of a high molecular weight aliphatic solvent comprising a paraffinic oil, for example petrolatum oil, and a low molecular weight solvent, such as those mentioned above (for example cyclohexane or methylcyclohexane). This suspension is then prepared by dispersive grinding of the rare earth salt in this paraffinic oil in such a manner as to obtain a very fine and homogeneous suspension of the salt.

According to a preferred embodiment of the invention, a tris[bis(2-ethylhexyl)phosphate] salt of said rare earth metal or metals is used as the salt.

Even more preferably, said rare earth salt is neodymium tris[bis(2-ethylhexyl)phosphate].

Alkylating agents usable in the catalytic system of the invention which may be mentioned are alkylaluminiums such as:

trialkylaluminiums, for example triisobutylaluminium, or
dialkylaluminium hydrides, for example diisobutylaluminium hydride.

It will be noted that this alkylating agent preferably consists of diisobutylaluminium hydride.

Preferably, the "alkylating agent:rare earth salt" molar ratio is strictly between 5 and 30 and it is for example strictly between 5 and 10.

Preferably an alkylaluminium monohalide and, even more preferably, diethylaluminium chloride is used as alkylaluminium halide usable as halogen donor in the catalytic system according to the invention.

According to the invention, it will be noted that the "halogen donor:rare earth salt" molar ratio may have a value ranging from 2 to 3.5 and, preferably, from 2.6 to 3.

In a particularly advantageous embodiment of the invention, diisobutylaluminium hydride and diethylaluminium chloride are used in combination as alkylating agent and halogen donor, respectively.

The catalytic systems according to the invention are prepared by carrying out the following steps:

in a first, optional, solvation step, a suspension of said rare earth salt(s) in said inert hydrocarbon solvent is produced, in a second step, there is added to the suspension obtained in the first step said conjugated diene monomer or alternatively, in the case where the first step has not been carried out, said solvent is added to said salt in addition to said conjugated diene monomer, in a third step, said alkylating agent is added to the suspension obtained at the end of said second step in order to obtain an alkylated salt, and in a fourth step, said halogen donor is added to said alkylated salt.

The polybutadiene preparation process according to the invention consists of reacting said catalytic system in an inert hydrocarbon polymerisation solvent, for example cyclohexane, and in the presence of butadiene, so that the polybutadiene obtained has a polydispersity index Ip, measured by said "SEC" technique, which is less than 2.1.

This process is preferably carried out at a temperature of from 0° C. to 100° C.

The aforementioned characteristics of the present invention, as well as others, will be better understood on reading the following description of several examples of embodiment of the invention, which are given by way of illustration and not of limitation.

I. PREPARATION OF CATALYTIC SYSTEMS OF THE INVENTION

1) Synthesis of Organic Phosphate Salts of Neodymium According to the Invention

A plurality of tests were carried out for synthesis of these salts. The synthesis methods which are described in detail below were used for each of these tests.

1.1) Synthesis of a Neodymium Phosphate Salt for Preparing the Catalytic Systems 1 to 3 According to the Invention (See Section I.2) Hereafter):

a) Synthesis of an Aqueous Solution of Neodymium $NdCl_3$, $6H_2O$:

96 g of $Nd_2O_3$ (sold by RHODIA), which has been determined by complexation analysis to have an Nd content of 85.3% (theoretical value 85.7%), so amounting to 0.57 mol of Nd, are weighed out into a "tall" form 600 ml beaker.

80 ml of demineralised water was added. Under a fume hood, 150 ml of 36% by weight concentrated HCl (d=1.18), namely 1.75 mol of HCl (molar ratio HCl:Nd=1.75:

0.57=3.07), are slowly added at ambient temperature while the mixture is stirred with a magnetic stirrer.

The reaction $Nd_2O_3+6HCl+9H_2O \rightarrow 2NdCl_3, 6H_2O$ is highly exothermic.

Once all the hydrochloric acid has been added, the solution is brought to boiling while being stirred with a magnetic stirrer, in order to eliminate the excess hydrochloric acid. The aqueous $NdCl_3$ solution is clear and mauve in colour. No insoluble product ($Nd_2O_3$) remains.

This solution is then evaporated until a volume of approximately 130 ml is obtained in the beaker. The solution of $NdCl_3, 6H_2O$ is then highly concentrated (it crystallises at ambient temperature).

Then the concentrated solution of $NdCl_3$ is poured into a 10 liter drum containing 4500 ml of demineralised water with stirring and at ambient temperature (using a motor with anchor agitator).

The pH of the solution, measured at 25° C., is close to 4.

Then 1500 ml of technical-grade acetone is added to the solution. No insoluble product remains, and the resultant solution is pink in colour.

b) Synthesis of an Organic Sodium Phosphate of Formula $[RO]_2P(O)ONa$ (R=2-ethylhexyl):

68 g, or 1.70 mol, of NaOH flakes are dissolved in a 5 liter beaker containing 1500 ml of demineralised water. 554 g of an organic phosphoric acid (bis(2-ethylhexyl)phosphoric acid, listed in the "Aldrich" catalogue under number 23,782–5), namely 1.72 mol of this acid, are dissolved in another 3 liter beaker containing 500 ml of acetone. The molar ratio NaOH:organic phosphoric acid is 1.70:1.72 or 0.99.

At ambient temperature and while stirring the mixture by hand with a glass stirrer, the solution of said organic phosphoric acid is poured into the NaOH solution. The reaction is as follows:

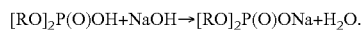

The reaction is slightly exothermic and a homogeneous solution of a yellowish colour is obtained. The pH of the solution, measured at 25° C., is close to 7.

c) Synthesis of a Phosphated Neodymium Salt of Formula $[[RO]_2P(O)O]_3Nd$:

At ambient temperature and while the mixture is being vigorously stirred (motor with anchor agitator), the organic Na phosphate solution obtained in section b) above is poured into the aqueous solution of $NdCl_3,6H_2O$ obtained in section a) above.

A very fine white precipitate forms immediately. The mixture obtained is kept with stirring for 30 minutes, after the addition of all the organic Na phosphate (in a molar ratio $(RO)_2P(O)ONa:NdCl_3=1.70:0.57=2.98$). The reaction is as follows:

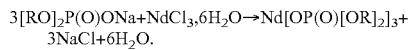

The resultant phosphated neodymium salt is recovered and washed in a centrifuge equipped with a "sock".

The pH of the mother liquors is between 3 and 4 at 25° C. These mother liquors are colourless and clear.

The salt obtained is separated into two samples, then each sample is washed with an acetone/demineralised water mixture by effecting the washing cycle described below three times, in order to eliminate all the chlorides.

Each washing cycle is performed in a 10 liter plastic bucket initially containing 2 liters of acetone. Each sample is homogenised with the acetone using an "Ultra-Turrax" homogeniser for approx. 1 minute in order to obtain a milky solution.

Then 4 liters of demineralised water is added to the bucket, then the mixture obtained is homogenised by means of the same homogeniser for 3 minutes.

The resultant mixture is centrifuged and the phosphated neodymium salt is recovered in the "sock".

The qualitative analytic test for chlorides is virtually negative for the final washing water (the reaction is as follows: $NaCl+AgNO_3$ (HNO3 medium)$\rightarrow AgCl\downarrow +NaNO_3$).

The neodymium salt washed in this manner is dried in an oven at 60° C., under a vacuum and with air-flow for approx. 80 hours.

The final yield for each of the synthesis tests performed is between 95% and 98%, depending upon the losses arising during washing. In each case, approx. 600 g of dry phosphated neodymium salt are obtained.

The mass contents of neodymium, determined both by complexometric back titration with ethylenediaminetetraacetic acid (EDTA) and by inductively-coupled plasma atomic emission spectrometry (abbreviated to ICP/AES), are substantially between 12.5% and 12.8% (with a theoretical content τ of 13.01% where $\tau=[144.24/1108.50]\times 100$, where 144.24 g/mol=molar mass of neodymium).

For each of these two methods, the neodymium content measurements were performed after wet acid mineralisation of the salt, either in a sand bath in an open system or in a microwave oven in a closed system.

The complexometric back titration with EDTA involves back titration with complexation of neodymium with an excess of EDTA (ethylenediaminetetraacetic acid), in which the excess EDTA is determined at pH=4.6 with zinc sulphate.

A coloured indicator was used with photometric detection of the equivalence point.

Inductively-coupled plasma atomic emission spectrometry is an elemental analytical method based on the observation of the radiation emitted by atoms raised to an excited state in a plasma.

The emitted radiation used for analysis of neodymium corresponds to wavelengths of 406.109 nm and 401.225 nm.

This spectrometric method was implemented by previously calibrating the system with "control" neodymium salts having a known neodymium content.

The following table shows the Nd contents obtained by means of these two methods (the number of tests performed on each salt sample is shown in brackets).

| Salt samples analysed | Percentage Nd content by complexometric titration | Percentage Nd content by ICP/AES | Relative deviation between the 2 methods |
|---|---|---|---|
| Phosphated Nd salt $[[RO]_2P(O)O]_3Nd$ | 12.8 (9) | 12.8 (3) | 0% |
| Phosphated Nd salt $[[RO]_2P(O)O]_3Nd$ | 12.8 (4) | 12.6 (3) | 1.6% |
| Phosphated Nd salt $[[RO]_2P(O)O]_3Nd$ | 12.7 (6) | 12.2 (4) | 4% |
| Phosphated Nd salt $[[RO]_2P(O)O]_3Nd$ | 12.6 (6) | 12.5 (4) | 0.8% |
| Nd acetylacetonate "control" | 31.7 (6) | 32.4 (4) | 2.2% |

-continued

| Salt samples analysed | Percentage Nd content by complexometric titration | Percentage Nd content by ICP/AES | Relative deviation between the 2 methods |
|---|---|---|---|
| Nd oxalate "control" | 37.7 (3) | 38.0 (3) | 0.8% |

The results obtained by the two methods are comparable (relative deviation <4%).

1.2) Synthesis of a Neodymium Phosphate Salt for Preparing the Catalytic Systems 4 to 6 According to the Invention and the "Control" Catalytic Systems 1 and 2 (See Section I.2) Hereafter):

a) Synthesis of an Aqueous Solution of Neodymium $NdCl_3, 6H_2O$:

0.864 kg of $Nd_2O_3$, or 5.10 moles of Nd, is weighed into a reactor.

27 kg of demineralised water is added. 1.35 l of 36% by weight concentrated HCl (d=1.18) is added slowly, at ambient temperature.

The reaction $Nd_2O_3+6HCl+9H_2O \rightarrow 2NdCl_3, 6H_2O$ is highly exothermic.

Once all the hydrochloric acid has been added, the solution is brought to boiling with stirring for 30 minutes, in order to eliminate the excess hydrochloric acid. The aqueous $NdCl_3$ solution is clear and mauve in colour. No insoluble product ($Nd_2O_3$) remains.

The pH of the solution, measured at 25° C., is corrected by adding 0.55 l of 2 moles per liter sodium hydroxide. The final pH is 4.47.

b) Synthesis of an Organic Sodium Phosphate of Formula $[RO]_2P(O)ONa$ (R=2-ethylhexyl):

0.612 kg, or 15.3 mol, of NaOH flakes are dissolved in a reactor containing 24 kg of demineralised water. 5.028 kg of an organic phosphoric acid (bis(2-ethylhexyl)phosphoric acid, listed in the "Aldrich" catalogue under number 23,782–5), namely 15.61 mol of this acid, is dissolved in another reactor containing 9 l of acetone.

At ambient temperature, the solution of said organic phosphoric acid is poured into the solution of NaOH. The reaction is as follows:

$$[RO]_2P(O)OH+NaOH \rightarrow [RO]_2P(O)ONa+H_2O.$$

The reaction is slightly exothermic, and a homogeneous solution of a yellowish colour is obtained. The pH of the solution, measured at 25° C., is equal to 5.4.

c) Synthesis of a Phosphated Neodymium Salt of Formula $[[RO]_2P(O)O]_3Nd$:

At a temperature of 36° C. and while the mixture is being vigorously stirred, the aqueous solution of $NdCl_3,6H_2O$ obtained in section a) above is poured on to the organic Na phosphate solution obtained in section b) above.

A very fine white precipitate forms immediately. The mixture obtained is kept stirred for 15 minutes, after the addition of all the organic Na phosphate:

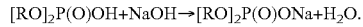
$$3[RO]_2P(O)ONa+NdCl_3,6H_2O \rightarrow Nd[OP(O)[OR]_2]_3+ 3NaCl+6H_2O.$$

The resultant phosphated neodymium salt is recovered by sedimentation and washed with a mixture of 45 liters of demineralised water and 15 liters of acetone for 15 minutes. The phosphated neodymium salt is then recovered by centrifugation.

The pH of the mother liquors is between 3 and 4 at 25° C. These mother liquors are colourless and clear.

The qualitative analytic test for chlorides is virtually negative for the final washing water (the reaction is as follows: $NaCl+AgNO_3$ ($HNO_3$ medium)$\rightarrow AgCl\downarrow+NaNO_3$).

The neodymium salt washed in this manner is dried in an oven at 60° C., under a vacuum and with air-flow for 72 hours.

1.3) Synthesis of a Neodymium Phosphate Salt for Preparing the Catalytic System 7 According to the Invention (See Section I.2) Hereafter):

a) Synthesis of an Aqueous Solution of Neodymium $NdCl_3, 6H_2O$:

0.288 kg of $Nd_2O_3$, or 1.7 moles of Nd, is weighed into a reactor.

9 kg of demineralised water is added. 0.45 liters of 36% by weight concentrated HCl (d=1.18) is added slowly, at ambient temperature.

The reaction $Nd_2O_3+6HCl+9H_2O \rightarrow 2\ NdCl_3, 6H_2O$ is highly exothermic.

Once all the hydrochloric acid has been added, the solution is brought to boiling with stirring for 30 minutes, in order to eliminate the excess hydrochloric acid. The aqueous $NdCl_3$ solution is clear and mauve in colour. No insoluble product ($Nd_2O_3$) remains.

The pH of the solution, measured at 25° C., is corrected by adding 0.2 l of 2 moles per liter sodium hydroxide. The final pH is 3.5.

b) Synthesis of an Organic Sodium Phosphate of Formula $[RO]_2P(O)ONa$ (R=2-ethylhexyl):

0.204 kg, or 5.1 mol, of NaOH flakes is dissolved in a reactor containing 8 kg of demineralised water. 1.659 kg of an organic phosphoric acid (bis(2-ethylhexyl)phosphoric acid, listed in the "Aldrich" catalogue under number 23,782-5), namely 5.15 mol of this acid, is dissolved in another reactor containing 3 l of acetone.

At ambient temperature, the solution of said organic phosphoric acid is poured into the solution of NaOH. The reaction is as follows:

$$[RO]_2P(O)OH+NaOH \rightarrow [RO]_2P(O)ONa+H_2O.$$

The reaction is slightly exothermic and a homogeneous solution of a yellowish colour is obtained. The pH of the solution, measured at 25° C., is equal to 5.

c) Synthesis of a Phosphated Neodymium Salt of Formula $[[RO]_2P(O)O]_3Nd$:

While the mixture is being vigorously stirred and at a temperature of [between] 35 and 40° C. the organic Na phosphate solution obtained in section b) above is poured into the aqueous solution of $NdCl_3,6H_2O$ obtained in section a) above.

A very fine white precipitate forms immediately. The mixture obtained is kept stirred for 15 minutes, after the addition of all the organic Na phosphate:

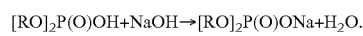
$$3[RO]_2P(O)ONa+NdCl_3,6H_2O \rightarrow Nd[OP(O)[OR]_2]_3 +3\ NaCl+6H_2O.$$

The resultant phosphated neodymium salt is recovered by sedimentation and washed with a mixture of 15 liters of demineralised water and 5 liters of acetone for 5 minutes. The phosphated neodymium salt is then recovered by centrifugation.

The pH of the mother liquors is between 3 and 4 at 25° C. These mother liquors are colourless and clear.

The qualitative analytic test for chlorides is virtually negative for the final washing water (the reaction is as follows: $NaCl+AgNO_3$ ($HNO_3$ medium)$\rightarrow AgCl\downarrow +NaNO_3$).

The neodymium salt washed in this manner is dried in an oven at 60° C., under a vacuum and with air-flow for 72 hours.

2) Synthesis of "Control" Catalytic System and Catalytic System According to the Invention from these Salts:

In order to obtain each catalytic system, the corresponding neodymium salt, in powder form, is poured into a reactor from which the impurities have been removed beforehand. This salt is then subjected to nitrogen bubbling for 15 minutes.

First (Optional) Solvation Step:

A solvent consisting of cyclohexane or methylcyclohexane is introduced into the reactor containing the neodymium salt in order to form a gel, the period for which and temperature at which this solvent and the neodymium salt are brought into contact being either 3 hours at a temperature of between 20 and 25° C., or 30 min. at 30° C.

Second, "Preformation", Step of Each Catalytic System:

Then butadiene is introduced into the reactor at a temperature of 30° C., as is a supplementary quantity of said solvent (this supplementary addition of solvent is not necessary in the case of prior salvation). It will be noted that practically all the solvent has to be added during this second step, if said first step has not been carried out.

Third, Alkylation, Step:

Then diisobutylaluminium hydride (DiBAH) or triisobutylaluminium (TiBA) is introduced into the reactor as alkylating agent of the neodymium salt, in a concentration of approximately 1 M. The alkylation lasts for 15 min. The temperature of the alkylation reaction is either between 20 and 25° C. or equal to 30° C.

Fourth, Halogenation, Step:

Diethylaluminium chloride (DEAC) or ethylaluminium sesquichloride is then introduced into the reactor as the halogen donor in a concentration of approx. 1 M. The temperature of the reaction medium is adjusted to 60° C.

Fifth, Ageing, Step:

Ageing of the mixture thus obtained is then carried out by maintaining this temperature of 60° C. for a period of 120 minutes.

Finally, the catalytic solution is stored under a nitrogen atmosphere in a freezer at a temperature of −15° C.

The "control" catalytic system and the catalytic system according to the invention obtained have the following molar ratios (butadiene, alkylating agent and halogen donor "HD") relative to the neodymium salt:

Nd: butadiene:DiBAH or TiBA:HD=1:47 or 50:6, 10, 15 or 20:2.2, 2.3 or 3.

Table 1 hereafter shows the characteristics of these catalytic systems, where:

conc.=concentration

CH=cyclohexane and MCH=methylcyclohexane butadiene:Nd="conjugated diene monomer: neodymium salt" molar ratio Al:Nd="alkylating agent: neodymium salt" molar ratio HD:Nd="halogen donor: neodymium salt" molar ratio SESQUICHL.=ethylaluminium sesquichloride DiBAH=diisobutylaluminium hydride, and TiBA=triisobutylaluminium.

It will be noted that the solutions of alkylaluminium and alkylaluminium halide used are in a concentration of approximately 1 M in the solvent (CH or MCH).

TABLE 1

| Catalytic systems | Final Nd conc. (mol/l) | Solvation Time temperature solvent | Preforming butadiene: Nd | Alkylation Agent, Conc. agent (mol/l), Al: Nd | Alkylation Time temperature | Halogenation HD used, Conc. HD (mol/l), DH: Nd | Ageing Time temperature |
|---|---|---|---|---|---|---|---|
| "control" 1 | 0.0002 | 30 min. 30° C. MCH | 50 | DiBAH 0.875 10 | 15 min. 30° C. | DEAC 1.018 3 | 120 min. 60° C. |
| "control" 2 | 0.0201 | 30 min. 30° C. MCH | 50 | DiBAH 0.885 10 | 15 min. 30° C. | SESQUICHL 0.968 1.85 | 120 min. 60° C. |
| Invention 1 | 0.0201 | 180 min. 20 to 25° C. CH | 47 | DiBAH 1.17 10 | 15 min. 20 to 25° C. | DEAC 2.45 2.2 | 120 min. 60° C. |
| Invention 2 | 0.0201 | 180 min. 20 to 25° C. CH | 47 | DiBAH 1.17 15 | 15 min. 20 to 25° C. | DEAC 2.45 2.2 | 120 min. 60° C. |
| Invention 3 | 0.0201 | 180 min. 20 to 25° C. CH | 47 | DiBAH 1.17 20 | 15 min. 20 to 25° C. | DEAC 2.45 2.2 | 120 min. 60° C. |
| Invention 4 | 0.0201 | 30 min. 30° C. MCH | 50 | DiBAH 0.885 10 | 15 min. 30° C. | DEAC 0.968 3 | 120 min. 60° C. |
| Invention 5 | 0.0201 | No solvation | 50 | DiBAH 0.885 10 | 15 min. 30° C. | DEAC 0.968 3 | 120 min. 60° C. |
| Invention 6 | 0.0201 | 30 min. 30° C. MCH | 50 | TiBA 0.778 10 | 15 min. 30° C. | DEAC 0.968 3 | 120 min. 60° C. |

TABLE 1-continued

| Catalytic systems | Final Nd conc. (mol/l) | Solvation Time temperature solvent | Preforming butadiene: Nd | Alkylation Agent, Conc. agent (mol/l), Al: Nd | Alkylation Time temperature | Halogenation HD used, Conc. HD (mol/l), DH: Nd | Ageing Time temperature |
|---|---|---|---|---|---|---|---|
| Invention 7 | 0.0200 | 30 min. 30° C. MCH | 50 | DiBAH 0.947 6 | 15 min. 30° C. | DEAC 3 | 120 min. 60° C. |

II. POLYMERISATION OF BUTADIENE USING THESE CATALYTIC SYSTEMS

1) Operating Method for the Various Polymerisations

A "Steinie" bottle which had previously been washed and dried is used as the polymerisation reactor. Each polymerisation reaction of the butadiene is carried out at 50° C. or 60° C. and in an inert atmosphere (nitrogen).

For each polymerisation, cyclohexane is introduced into said bottle as polymerisation solvent, except when the catalytic system used comprises neodymium in the very reduced concentration of the order of 0.0002 mol/l (in this latter case, the polymerisation is carried out solely by adding the butadiene to be polymerised to the catalytic system). This cyclohexane which may have been introduced is then subjected to nitrogen bubbling for 10 minutes to eliminate impurities.

A "polymerisation solvent (cyclohexane):monomer (butadiene)" mass ratio varying from 7 to 95 was used (said mass ratio is hereafter denoted "S:M").

The quantity of neodymium catalyst base ranges from 60 μmol to 2453 μmol per 100 g of butadiene, depending upon the test performed (quantity is stated in μMcm in Table 2 below).

Methanol (1 ml) or acetylacetone (used in excess) are used to stop the polymerisation reactions.

N-1,3-dimethylbutyl-N'-phenyl-p-phenylenediamine (6PPD) is used as protection agent (in a mass of 0.2 g per 100 g elastomer) for the polymeric solutions obtained by means of the "control" catalytic systems and catalytic systems 4 to 7 according to the invention, whereas a protection agent "AO2246" is used (in a volume of 1 ml of a 100 g/l solution of toluene) for the polymeric solutions obtained by means of the other catalytic systems 1 to 3 according to the invention.

Then the polybutadienes are extracted from the polymeric solutions thus obtained, either by steam stripping in the presence of calcium tamolate and either drying on rollers at 100° C. or drying in an oven at 60° C. in a vacuum with a gentle stream of nitrogen, or by devolatilisation by establishing a vacuum under nitrogen at 50° C.

2) Details of Polymerisation Reactions Carried out by Means of these Catalytic Systems:

Table 2 below shows the characteristics of each polymerisation reaction performed, in particular in terms of:
  quantity of neodymium catalytic base used (Nd in μMcm, that is to say in micromoles per 100 g of butadiene monomer to be polymerised),
  conversion rate (in %) of butadiene to polybutadiene as a function of reaction time determined in minutes (used to described the polymerisation kinetics),
  S:M mass ratio (cyclohexane solvent: butadiene monomer to be polymerised) and polymerisation temperature T.

This table 2 also shows the characteristics of the polybutadienes obtained, in particular in terms of:
  inherent viscosity $\eta_{inh}$ at 0.1 g/dl in toluene, measured at 25° C. in accordance with the method described in the attached Appendix 3, and Mooney viscosity ML(1+4) at 100° C., measured in accordance with ASTM Standard D 1646,
  polydispersity index Ip, measured by size exclusion chromatography (SEC), see Appendix 2, section c1) for analysis of the polybutadienes obtained in tests T1, T1', T1", T2, T2', T2", I4, I5, I6, and Appendix 2, section c2) for analysis of the polybutadienes obtained in the other tests I1, I2, I3 and I7,
  content of cis-1,4 linkages, trans linkages and 1,2 linkages, measured by the technique of near-infrared analysis (NIR), see Appendix 1.

TABLE 2

| Tests | Catalytic system | Quantity of Nd (μmolcm) | Ratio S:M and T (° C.) | Reaction time (min.) | Conversion rate (%) | $\eta_{inh}$ (dl/g) | Mooney ML(1 + 4) 100° C. | Ip | Cis-1,4 units (%) | Trans units (%) | 1,2 units (%) |
|---|---|---|---|---|---|---|---|---|---|---|---|
| T1 | "control" 1 | 2453 | 94 50° C. | 70 | 99 | 2.27 | not measured | 27.44 | 94.5 | 4.2 | 1.3 |
| T1' | "control" 1 | 2044 | 79 50° C. | 120 | 100 | 2.64 | not measured | 21.70 | 95.3 | 3.7 | 1.0 |
| T1" | "control" 1 | 1531 | 59 50° C. | 180 | 100 | 3.41 | 21 | >25 | 96.0 | 2.9 | 1.1 |
| T2 | "control" 2 | 247 | 9.8 50° C. | 390 | 86 | 2.15 | not measured | 2.72 | 99.1 | 0.8 | 0.1 |
| T2' | "control" 2 | 309 | 9.8 50° C. | 390 | 97 | 1.96 | not measured | 2.76 | | | |
| T2" | "control" 2 | 618 | 9.8 50° C. | 170 | 100 | 1.22 | not measured | 2.71 | | | |

TABLE 2-continued

| Tests | Catalytic system | Quantity of Nd (μmolcm) | Ratio S:M and T (° C.) | Reaction time (min.) | Conversion rate (%) | $\eta_{inh}$ (dl/g) | Mooney ML(1 + 4) 100° C. | Ip | Cis-1,4 units (%) | Trans units (%) | 1,2 units (%) |
|---|---|---|---|---|---|---|---|---|---|---|---|
| I1 | Invention 1 | 130 | 7 60° C. | 20 | 80 | 2.37 | | 1.77 | 98 | 1 | 1 |
| I2 | Invention 2 | 80 | 7 60° C. | 35 | 83 | 2.53 | | 1.56 | 98 | 1 | 1 |
| I3 | Invention 3 | 60 | 7 60° C. | 40 | 81 | 2.62 | | 1.75 | 98 | 1 | 1 |
| I4 | Invention 4 | 155 | 9.8 50° C. | 120 | 100 | 2.67 | not measured | 1.95 | | | |
| I4' | Invention 4 | 155 | 10.4 50° C. | 150 | 100 | 2.53 | 47 | 1.88 | 97.6 | 2.4 | 0 |
| I4" | Invention 4 | 184 | 10.4 50° C. | 150 | 100 | 2.37 | 41 | 1.91 | 97.1 | 2.9 | 0 |
| I5 | Invention 5 | 155 | 9.3 50° C. | 90 | 100 | 2.43 | not measured | 1.84 | 96.8 | 3.2 | 0 |
| I6 | Invention 6 | 618 | 9.3 50° C. | 5 | 100 | 2.85 | not measured | 2.05 | 96.9 | 3.1 | 0 |
| I7 | Invention 7 | 280 | 7.2 50° C. | 16 | 97 | 2.50 | not measured | 1.56 | 97.3 | 2.4 | 0.3 |

The results of these tests show overall that the catalytic systems 1 to 7 according to the invention, which are characterised, on one hand, in that they comprise as halogen donor an alkylaluminium halide which is not a sesquihalide and, on the other hand, the rare earth in a concentration greater than 0.005 mol/l (approximately 0.02 mol/l), enable polybutadienes to be obtained which has a polydispersity index of less than 2.1 and at the same time a Mooney viscosity greater than 40, which makes them particularly well-suited for tyre treads.

More precisely, the "control" tests T1, T1', T1 " show that the "control" catalytic system 1, which is characterised in that it comprises an alkylaluminium monohalide as halogen donor and neodymium in a concentration of less than 0.005 mol/l (approximately 0.0002 mol/l), results in polybutadienes being obtained which have a polydispersity index Ip greater than 20, which value is unacceptable within the scope of the present invention, and this even when varying the polymerization conditions (quantity of neodymium per 100 g of butadiene, in particular) to a great extent. Furthermore, the Mooney viscosity obtained (see the value of 21 in test T1") is very much less than the minimum value of 40 which is desired.

The "control" tests T2, T2', T2" show that the "control" catalytic system 2, which comprises an alkylaluminium sesquihalide as halogen donor and neodymium in a concentration according to the invention greater than 0.005 mol/l (approximately 0.020 mol/l), nevertheless results in polybutadienes being obtained which have a polydispersity index Ip greater than 2.70, which value is too high within the scope of the present invention, and this even when varying the polymerisation conditions (quantity of neodymium per 100 g of butadiene, in particular) to a great extent.

Tests I1, I2 and I3 according to the invention show that the catalytic systems 1, 2 and 3 of the invention, which comprise, with solvation in methylcyclohexane, an alkylaluminium monohalide (DEAC) as halogen donor and neodymium in a concentration of approximately 0.020 mol/l with an "alkylating agent DiBAH:Nd" molar ratio equal to 10, 15 or 20 respectively, results in polybutadienes being obtained which each have a polydispersity index Ip of a value very much less than 2.1.

Tests I4, I4' and I4" according to the invention show that the catalytic system 4 of the invention, which comprises, with solvation in cyclohexane, said DEAC as halogen donor and neodymium in a concentration of approximately 0.020 mol/l with an "alkylating agent DiBAH:Nd" molar ratio equal to 10, results in polybutadienes being obtained which have a polydispersity index Ip less than 2.1 and at the same time a Mooney viscosity greater than 40 (see values of 41 and 47 in tests I4' and I4"), and this even when varying the polymerisation conditions (quantity of neodymium per 100 g of butadiene, in particular) to a great extent.

Test I5 according to the invention shows that the catalytic system 5 of the invention, which comprises, without any solvation having been effected, said DEAC as halogen donor and neodymium in a concentration of approximately 0.020 mol/l with an "alkylating agent DiBAH:Nd" molar ratio equal to 10, results in a polybutadiene being obtained which has a polydispersity index Ip less than 2.1.

Test I6 according to the invention shows that the catalytic system 6 of the invention, which comprises, with solvation in methylcyclohexane, said DEAC as halogen donor, tri-isobutylaluminium (TiBA) as alkylating agent instead of DiBAH and neodymium in a concentration of approximately 0.020 mol/l with an "alkylating agent TiBA:Nd" molar ratio equal to 10, also results in a polybutadiene being obtained which has a polydispersity index Ip less than 2.1.

Test I7 according to the invention shows that the catalytic system 7 of the invention, which comprises, with solvation in methylcyclohexane, said DEAC as halogen donor, DiBAH as alkylating agent and neodymium in a concentration of approximately 0.020 mol/l with an "alkylating agent DiBAH:Nd" molar ratio of between 5 and 10 (equal to 6), also results in a polybutadiene being obtained which has a polydispersity index Ip very much less than 2.1.

It will be noted that the Mooney viscosities ML(1+4) at 100° C. of the polybutadienes obtained by means of the catalytic systems 1, 2, 3, 5, 6 and 7 according to the invention may be estimated at values greater than 40 although they have not in fact been measured, just like for tests I4' and I4" relative to said catalytic system 4, this estimation taking into account the corresponding values of inherent viscosity (in dl/g) and of polydispersity index.

It will also be noted that the polybutadienes obtained by means of the catalytic systems I1 to I7 according to the invention have high, reproducible contents of cis-1,4 linkages at least equal to 96.8%, measured by the technique of near-infrared analysis (NIR).

APPENDIX 1

Determination of the Microstructure of the Polybutadienes Obtained.

"Near infrared" (NIR) analysis was used. This is an indirect method making use of "control" elastomers whose microstructure has been measured by $^{13}C$ NMR. The quantitative relationship (Beer-Lambert law) prevailing between the distribution of the monomers in an elastomer and the shape of the elastomer's NIR spectrum is exploited. This method is carried out in two stages:

1) Calibration:
   The respective spectra of the "control" elastomers are acquired.
   A mathematical model is constructed which associates a microstructure to a given spectrum using the PLS (partial least squares) regression method, which is based on a factorial analysis of the spectral data. The following two documents provide a thorough description of the theory and practice of this "multi-variant" method of data analysis:
   (1) P. GELADI and B. R. KOWALSKI
   "Partial Least Squares regression: a tutorial", Analytica Chimica Acta, vol. 185, 1–17 (1986).
   (2) M. TENENHAUS
   "La régression PLS—Théorie et pratique" Paris, Editions Technip (1998).
2) Measurement:
The spectrum of the sample is recorded.
The microstructure is calculated.

APPENDIX 2

Determination of the Distribution of Molecular Weights of the Polybutadienes Obtained by Size Exclusion Chromatography (Sec)

a) Measurement Principle:
SEC (size exclusion chromatography) makes it possible physically to separate macromolecules by their size in the swollen state in columns filled with a porous stationary phase. The macromolecules are separated by their hydrodynamic volume, the bulkiest being eluted first.

Although not an absolute method, SEC does enable an assessment to be made of the molecular weight distribution of a polymer. On the basis of commercially available standards, the various number-average (Mn) and weight-average (Mw) molecular weights may be determined and the polydispersity index calculated (IP=Mw/Mn).

b) Preparation of the Polymer:
There is no particular treatment of the sample of polymer before analysis. It is simply solubilised in tetrahydrofuran, at a concentration of approx. 1 g/l.

c) SEC Analysis:
Case c1) The apparatus used is a "WATERS Alliance" chromatograph. The elution solvent is tetrahydrofuran, the flow rate is 1 ml/min., the temperature of the system is 35° C. and the duration of analysis is 90 min. A set of two columns of trade name "STYRAGEL HT6E" is used.

The volume of polymer sample solution injected is 100 µl. The detector is a "WATERS 2140" differential refractometer and the chromatographic data processing software is the "WATERS MILLENNIUM" system.

Case c2) The apparatus used is a "WATERS model 150C" chromatograph. The elution solvent is tetrahydrofuran, the flow rate 0.7 ml/min, the temperature of the system 35° C. and the duration of analysis 90 min. A set of four columns is used in series, the columns having the commercial names "SHODEX KS807", "WATERS type STYRAGEL HMW7" and two "WATERS STYRAGEL MHW6E".

The volume of polymer sample solution injected is 100 µl. The detector is a "WATERS model RI32X" differential refractometer and the chromatographic data processing software is the "WATERS MILLENNIUM" system (version 3.00).

APPENDIX 3

Determination of the Inherent Viscosity at 25° C.
of a 0.1 g/dl Polymer Solution in Toluene, Starting from a Solution of Dry Polymer Principle:
The inherent viscosity is determined by measuring the outflow rate t of the polymer solution and the outflow rate $t_o$ of the toluene, in a capillary tube.

The method breaks down into 3 major steps:
step No. 1: preparation of the 0.1 g/dl measuring solution in toluene;
step no. 2: measurement of the outflow rates t of the polymer solution and $t_o$ of the toluene at 25° C., in an "Ubbelohde" tube;
step no. 3: calculation of the inherent viscosity.

STEP No. 1—Preparation of the Measurement Solution from the Dry Polymer:
0.1 g of dry polymer (use of a precision balance of scale interval e=0.1 mg) and 100 ml of toluene of a purity greater than 99.5% are introduced into a washed 250 ml bottle which has been placed in an oven at 140° C. for at least 10 hours.

The bottle is placed on a shaking device for 90 minutes (or even more if the polymer is not solubilised).

STEP No. 2—Measurement of the Outflow Rates $t_o$ of the Toluene and t of the Polymer Solution at 25° C.:
1. Equipment:
   1 tank with a bath thermostatically controlled to 25° C.±0.1° C. provided with a running-water cooling system. The tank is filled ¼ with running water and ¾ with demineralised water.
   1 alcohol thermometer of type "PROLABO", placed in the thermostatically-controlled bath, with an uncertainty of ±0.1° C.
   1 "Ubbelohde" viscosimeter tube intended to be placed in a vertical position in the thermostatically-controlled bath.
   Characteristics of the Tubes Used:
   diameter of the capillary: 0.46 mm;
   capacity: 18 to 22 ml.
2. Measurement of the Outflow Rate $t_o$ of the Toluene:
   rinsing the tube by washing with toluene;
   introducing the quantity of toluene (purity greater than 99.5%) necessary for the measurement;
   checking that the thermostatically-controlled bath is at 25° C.;
   determining the outflow rate $t_o$.

3. Measurement of the Outflow Rate of the Polymer Solution t rinsing the tube by washing with the polymer solution;

introducing the quantity of polymer solution necessary for the measurement;

checking that the thermostatically-controlled bath is at 25° C.

determining the outflow rate t.

STEP No. 3—Calculation of the Inherent Viscosity:

The inherent viscosity is obtained by the following equation:

$$\eta_{inh} = \frac{1}{C}\ln\left[\frac{(t)}{(t_O)}\right]$$

where

C: concentration of the polymer solution in toluene in g/dl;

t: outflow rate of the polymer solution in toluene in seconds;

$t_o$: outflow rate of the toluene in seconds;

$\eta_{inh}$: inherent viscosity expressed in dl/g.

The invention claimed is:

1. A catalytic system usable for the polymerisation of conjugated dienes, based on at least:

a conjugated diene monomer, an organic phosphoric acid salt of one or more rare earth metals, said salt being in suspension in at least one inert, saturated and aliphatic or alicyclic hydrocarbon solvent, an alkylating agent selected from the group consisting of trialkyl aluminum and a dialkylaluminum hydride, the alkylating agent:rare earth salt(s) molar ratio being greater than 5, and a halogen donor which belongs to the family of alkylaluminum halides with the exception of alkylaluminum sesquihalides, wherein said rare earth metal(s) are present in a concentration equal to or greater than 0.005 mol/l.

2. A catalytic system according to claim 1, wherein said rare earth metal(s) is present in a concentration within a range from 0.010 mol/l to 0.060 mol/l.

3. A catalytic system according to claim 1, wherein said salt is a rare earth tris[bis(2-ethylhexyl)phosphate].

4. A catalytic system according to claim 3, wherein said salt is neodymium tris [bis(2-ethylhexyl)phosphate].

5. A catalytic system according to claim 1, wherein said alkylating agent:rare earth salt molar ratio is between 5 and 10.

6. A catalytic system according to claim 1, wherein the halogen donor:salt molar ratio exhibits a value ranging from 2 to 3.5.

7. A catalytic system according to claim 1, wherein the conjugated diene monomer:salt molar ratio exhibits a value ranging from 15 to 70.

8. A catalytic system according to claim 1, wherein said conjugated diene monomer is butadiene.

9. A catalytic system according to claim 1, wherein said halogen donor is an alkylaluminum monohalide.

10. A catalytic system according to claim 9, wherein said halogen donor is diethylaluminum chloride.

11. A catalytic system according to claim 1, wherein said alkylating agent is diisobutylaluminum hydride.

12. A process for the preparation of the catalytic system according to claim 1, which comprises the following steps:

preparing in a first, optional step, a suspension of said rare earth salt in said solvent, in a second step, adding to the suspension obtained in the first step said conjugated diene monomer or alternatively, where the first step has not been carried out, preparing a suspension by adding said solvent to said salt in addition to said conjugated diene monomer, in a third step, adding said alkylating agent to the suspension obtained at the end of said second step to obtain an alkylated salt, and in a fourth step, said halogen donor to said alkylated salt.

13. A process for preparing a polymer of a conjugated diene, which comprises contacting a catalytic system according to claim 1 and a conjugated diene in an inert hydrocarbon solvent and recovering said diene polymer, wherein the polymer obtained has a polydispersity index Ip, measured by size exclusion chromatography, which is less than 2.1.

14. A polymerization process according to claim 13, wherein said polymer furthermore has a Mooney viscosity ML(1+4) at 100° C., measured in accordance with Standard ASTM D 1646, which is equal to or greater than 40.

* * * * *